US008298605B2

(12) United States Patent
Rumbaut et al.

(10) Patent No.: US 8,298,605 B2
(45) Date of Patent: Oct. 30, 2012

(54) PROCESS FOR PRODUCING CHOCOLATE

(75) Inventors: Luc Joseph Paul Antonie Marie Rumbaut, Wieze (BE); Rik Jan Theo Weetjens, Melle (BE)

(73) Assignee: Barry Callebaut AG, Zurich (CH)

( * ) Notice: Subject to any disclaimer, the term of this patent is extended or adjusted under 35 U.S.C. 154(b) by 299 days.

(21) Appl. No.: 12/669,938

(22) PCT Filed: Jul. 17, 2008

(86) PCT No.: PCT/EP2008/005860
§ 371 (c)(1),
(2), (4) Date: Jan. 20, 2010

(87) PCT Pub. No.: WO2009/012930
PCT Pub. Date: Jan. 29, 2009

(65) Prior Publication Data
US 2010/0196574 A1    Aug. 5, 2010

(30) Foreign Application Priority Data

Jul. 21, 2007 (GB) .................................. 0714389.4

(51) Int. Cl.
*A23G 1/00* (2006.01)
(52) U.S. Cl. ......................................... 426/631; 426/93
(58) Field of Classification Search .................. 426/631, 426/93
See application file for complete search history.

(56) References Cited

U.S. PATENT DOCUMENTS

| | | | |
|---|---|---|---|
| 2,356,181 A | 8/1944 | Rubens | |
| 2,399,195 A | 4/1946 | Bodenheim | |
| 2,850,388 A | 9/1958 | Peebles et al. | |
| 3,663,231 A * | 5/1972 | Tourell | 99/485 |
| 3,764,079 A | 10/1973 | Consoli | |
| 4,017,645 A | 4/1977 | Ziccarelli | |
| 4,151,308 A | 4/1979 | Ziccarelli et al. | |
| 4,156,743 A * | 5/1979 | Schmitt | 426/631 |
| 4,440,797 A * | 4/1984 | Berkes et al. | 426/613 |
| 4,594,259 A | 6/1986 | Baker et al. | |
| 4,679,498 A * | 7/1987 | Chaveron et al. | 99/483 |
| 4,746,070 A | 5/1988 | Kuster | |
| 5,051,265 A | 9/1991 | Meister et al. | |
| 5,197,680 A | 3/1993 | Chauveau | |
| 5,215,771 A * | 6/1993 | Callebaut et al. | 426/231 |
| 5,320,427 A * | 6/1994 | Callebaut et al. | 366/151.1 |
| 5,554,409 A * | 9/1996 | Vezzani | 426/631 |
| 5,676,995 A * | 10/1997 | Cully et al. | 426/660 |
| 5,709,903 A | 1/1998 | St. John et al. | |
| 5,945,150 A | 8/1999 | Lipp | |
| 5,989,619 A | 11/1999 | Zumbe et al. | |
| 6,054,129 A | 4/2000 | Sato et al. | |
| 6,221,422 B1 | 4/2001 | Kruger et al. | |
| 6,582,747 B2 | 6/2003 | Myers et al. | |
| 6,592,927 B1 | 7/2003 | Kruger et al. | |
| 7,736,685 B2 * | 6/2010 | Parsons et al. | 426/631 |
| 2001/0012536 A1 | 8/2001 | Armstrong et al. | |
| 2003/0118708 A1 | 6/2003 | Kaiser et al. | |
| 2003/0175765 A1 | 9/2003 | Kessler et al. | |
| 2006/0117965 A1 | 6/2006 | Parsons et al. | |
| 2006/0121175 A1 | 6/2006 | Hanselmann | |
| 2006/0147584 A1 | 7/2006 | Robert | |
| 2006/0222753 A1 | 10/2006 | Harshberger | |

FOREIGN PATENT DOCUMENTS

| | | |
|---|---|---|
| DE | 3735087 | 6/1988 |
| DE | 4313149 | 10/1994 |
| EP | 940085 | 9/1999 |
| EP | 0997076 * | 5/2000 |
| EP | 1165239 | 1/2002 |
| EP | 1358804 | 11/2003 |
| EP | 1733625 | 12/2006 |
| GB | 1578986 | 11/1980 |
| GB | 2066642 | 7/1981 |
| GB | 2297760 | 8/1996 |
| HU | 42925 | 9/1987 |
| JP | 62253341 | 11/1987 |
| WO | WO 96/34535 | 11/1996 |
| WO | WO 99/38390 | 8/1999 |
| WO | WO 02/087351 | 11/2002 |
| WO | WO 03/059094 | 7/2003 |
| WO | WO 04/000028 | 12/2003 |
| WO | WO 2005/077197 | 8/2005 |

OTHER PUBLICATIONS

Beckett, S.T., "Industrial Chocolate Manufacture and Use," Blackie Academic & Professional: Glasgow, pp. 338-341, (1987).

Simon, E.J., "Zerkleinerung bei der schokoladen-herstellung—getrennte oder gemeinsame vermahlung?" *Rev. Int. Choc.*, vol. 24, No. 4, pp. 140-155, (1969).

Bolenz, S., et al., Pre-dried refiner flakes allow very short or even continuous conching of milk chocolate, Eur. Food Res. Technol., vol. 226, pp. 153-160, (2007).

Reudenbach, R., Prallzerkleinerung in der Kakao- und Schokoladenindustrie, Kakao+Zucker, pp. 459-464 (Oct. 1973).

Niediek, I.E.A., Ube rein verbessertes Milkchschokolademasse-herstellungsverfahren, Süsswaren, 3pp. 91-96, (1971).

* cited by examiner

*Primary Examiner* — Carolyn Paden
(74) *Attorney, Agent, or Firm* — Hoxie & Associates, LLC

(57) ABSTRACT

A process for producing a chocolate or chocolate-like product comprising: (i) dry grinding a mixture of solid components of chocolate or a chocolate-like product; and (ii) homogenizing the ground mixture with fat to form a liquid chocolate or chocolate-like product.

22 Claims, 1 Drawing Sheet

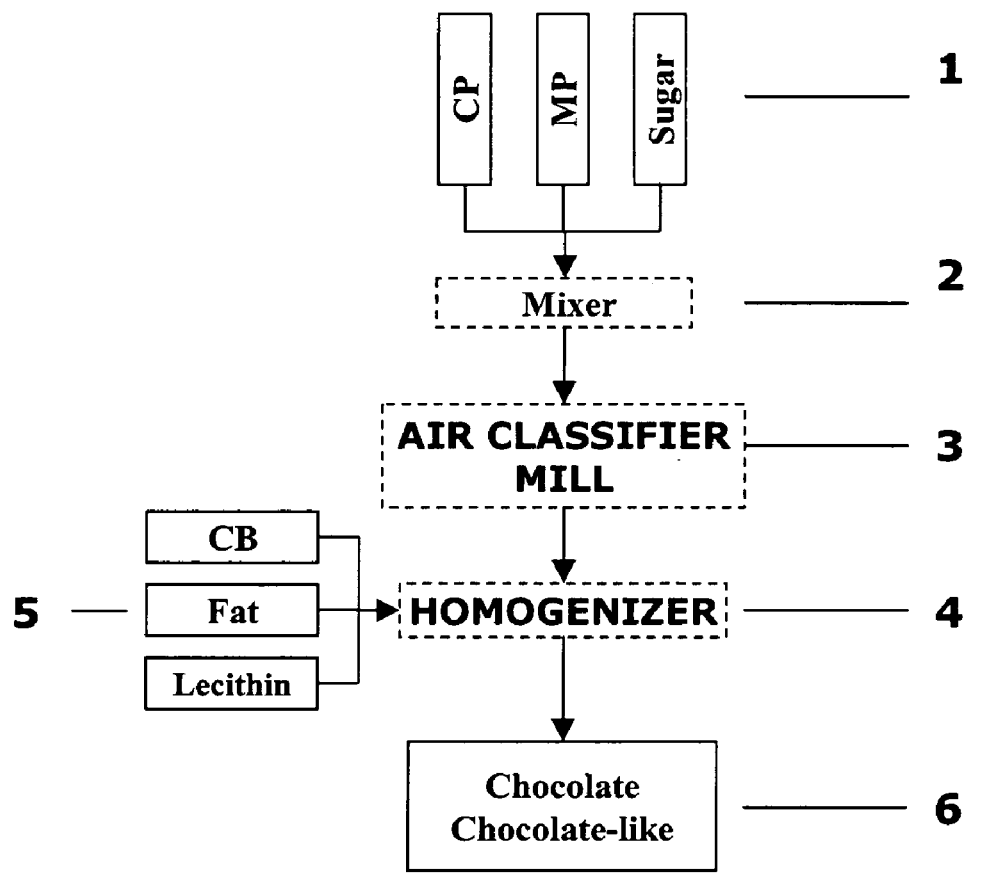

PROCESS FOR PRODUCING CHOCOLATE

CROSS REFERENCE TO RELATED APPLICATIONS

This application is a United States National Stage Application under 35 USC §371 of PCT/EP2008/005860, filed Jul. 17, 2008, which claims the benefit of GB Patent Application No. 0714389.4, filed Jul. 21, 2007, the contents of each of which are incorporated herein by reference.

BACKGROUND OF THE INVENTION

This invention relates to a process for producing chocolate or a chocolate-like product and to the chocolate or chocolate-like product thereby produced.

Many processes are known for producing chocolate and chocolate-like products. Chocolate-like products are materials in which at least a part of the cocoa butter in chocolate is replaced by another fat, such as butterfat or a vegetable fat. Processes for producing chocolate and chocolate-like products typically involve dispersing finely ground powders in a fat phase. The finely ground powders may include, for example, cocoa solids, sugar and optionally milk solids. The ingredients that are used are dictated by the nature of the product. Plain chocolate contains cocoa solids but generally does not contain non-fat milk solids, whereas milk chocolate does contain non-fat milk solids and milk fat as additional ingredients. White chocolate is prepared without the addition of cocoa mass or cocoa powder. The fat used to produce the chocolate is typically cocoa butter, optionally at least partly replaced by another fat in chocolate-like products.

In the traditional method for producing chocolate and chocolate-like products, the ingredients are mixed and ground in a refiner or mill to reduce the particle size of the solids. The resulting paste is then conched. Conching is a flavour-developing step which involves the intimate mixing or kneading of the chocolate ingredients and is traditionally carried out at elevated temperatures. During conching, the flavour of the product develops and the desired viscosity is obtained. Typically, the free acid and water content of the chocolate are reduced during conching. Conching is a time-consuming step in the process and typically takes from a few hours to a few days, depending on the product and the equipment used. After conching, the product may be cooled and optionally tempered.

Conching is generally regarded as an essential step in the process in order to develop the flavour and lower the viscosity of the product. However, because it involves maintaining the product at an elevated temperature for a relatively long time, it is relatively energy intensive step.

A method and device for producing chocolate with a shortened conching time, or with no conching step, is described in WO 2004/000028. The device uses a premixer which delivers chocolate flakes to a gear pump. The gear pump extrudes the product through small holes in a die plate and the resulting mixture is passed to a pin mixer for homogenization.

Niediek, Süsswaren, 3, 1971, 91-96 discloses a process for making milk chocolate. Reudenbach, Kakao+Zucker, 10, 1973, 459-464 describes a process for producing a milk chocolate.

U.S. Pat. No. 4,679,498 describes an extrusion process for preparing a chocolate paste.

U.S. Pat. No. 5,945,150 discloses a process for manufacturing chocolate in which a paste is milled and conched before being transferred to a high shear mixer for final liquefaction of the chocolate paste.

U.S. Pat. No. 2,356,181 relates to the manufacture of chocolate by a process that involves a conching step in what is termed a mechanical mixing machine.

GB-A-2066642 describes a process and apparatus for the continuous production of chocolate stock. In the process, a raw chocolate stock containing almost all of the components of the final product, and having a fat content of at least 23% by weight, is first prepared and subjected to roller refining.

There remains a need for processes for making chocolate that can reduce conching times or avoid conching altogether. There is also a need for processes that can be operated more economically. In particular, there is a need for processes that can be used to make low fat chocolate and chocolate-like products.

SUMMARY OF THE INVENTION

According to the invention, there is provided a process for producing a chocolate or chocolate-like product comprising:
 (i) dry grinding a mixture of solid components of chocolate or a chocolate-like product; and
 (ii) homogenizing the ground mixture with fat to form a liquid chocolate or chocolate-like product.

Also provided by the invention are chocolate and chocolate-like products made according to the process of the invention.

The process of the invention has the advantage of avoiding the need for a conching step. This is achieved by a method that comprises dry mixing of the components followed by homogenizing with fat.

DETAILED DESCRIPTION OF THE INVENTION

The first step of the process involves the dry grinding of a mixture of solid components of chocolate comprising part of the components of the chocolate or chocolate-like product. By "part of the components", it is meant that not all of the components of the final chocolate product are present i.e., not all of the components of the final chocolate or chocolate-like product may have been included and/or the components may not have been added in the amounts present in the final product.

Typically, the components include cocoa solids, sugars, sugar substitutes, milk powders, fat and mixtures thereof. Preferably, the cocoa solids are selected from cocoa powders, expeller flake and mixtures thereof. Milk powders include, for example, skimmed milk powder, whey powder and derivatives thereof, full cream milk powder and mixtures thereof. Suitable sugars include sucrose, fructose, glucose and dextrose and mixtures thereof. Sugar substitutes preferably include inulin, dextrin, isomaltulose, polydextrose and maltitol and mixtures thereof.

Preferably, the mixture that is subjected to dry grinding in (i) comprises at least two of cocoa powder, milk powder, and sugar. Cocoa powder and sugar are used for producing dark chocolate. Cocoa powder, milk powder and sugar are used to produce milk chocolate. Milk powder and sugar are used to produce white chocolate. Preferably, the mixture that is formed in (i) comprises cocoa powder, optionally milk powder, and sugar. These components are more preferably present in the same amount as in the final chocolate product i.e., no more of these components is added at a later stage of the process.

Preferably, the particle size is reduced during dry grinding to less than 80 μm, more preferably less than 50 μm, such as less than 30 μm or less than 25 μm. Advantageously, in (i) the mixture is ground such that it comprises solids having a particle size of from 5 to 50 µm, preferably from 10 to 30 µm, most preferably from 15 to 25 µm. Particle sizes may be determined by the method described in the Examples section below.

Preferably, dry grinding is carried out using a classifier mill, more preferably an air classifier mill. More preferably, the air classifier mill is a radial classifier having an air purge system. Air classifier mills that can be used in the invention are commercially available. Suitable apparatus is available from, for example, P. M. Duyvis Machinefabriek BV, The Netherlands. The term dry is not intended to signify the complete absence of water but to indicate that the grinding is performed on a powder in the absence of a liquid medium, typically in the absence of liquid fat. This will be well known to those skilled in the art. During grinding, the particle size of the solids present in the mixture is reduced.

The ground mixture produced in (i) is suitable for homogenization. Thus, it may be used in step (ii) without intervening process steps.

The process of the invention preferably does not involve a step of particle size reduction using a roller refiner, such as a 5-roller refiner or a 2-roller refiner. This can reduce investment costs for the equipment.

Preferably, the mixture of step (i) comprises fat in an amount of less than 22% by weight of the mixture, more preferably less than 12% by weight of the mixture, even more preferably from 0.1 to 8% by weight of the mixture, such as from 1% to 4% by weight of the mixture.

In step (ii) of the process of the invention, the mixture is homogenized with fat, preferably using a rotor/stator homogenizer. It will be appreciated that the homogenizer will typically operate in-line. The fat can be partly from the components of the mixture but preferably includes added fat. The fat is preferably added during homogenization. Other components of the final product may be added to the mixture before or during homogenization. Emulsifiers, such as lecithin, are preferably added, for example.

During homogenization, the temperature advantageously rises due to the mechanical action of the homogenizer on the mixture. This is advantageous because it allows thorough heating of the mixture directly into the mixture itself (rather than via an outside surface of a container for the mixture) and since it reduces the time to reach temperatures normally used in conching that are responsible for taste changes. The homogenizing step is preferably carried out such that a temperature rise of at least 10° C., preferably a rise between 20 and 60° C. most preferably a rise between 40 and 50° C. is achieved in the mixture by mechanical input.

Preferably, the homogenizing step is carried out such that the reduction in the particle size during homogenization is less than 25%, more preferably less than 10%. More preferably, the homogenizing step is carried out such that the particle size does not change significantly (or at all) during the homogenization step. This means that the particle size of the solids in the final product is dictated solely by the refining step(s).

A preferred rotor/stator homogenizer for use in the invention is preferably as described in DE-A-4313149 (Imcatec GmbH; Lipp), the contents of which are incorporated herein by reference. The homogenizer is available commercially from Lipp Mischtechnik GmbH, Mannheim, Germany under the trade name Reflector®. The preferred rotor/stator homogenizer comprises a single-shaft inline mixer which works on the rotor/stator principle. Axially arranged rotor blades intermesh with the toothed rings of the stator. The toothed rings of the stator are peripherally arranged. The toothed rings of the stator together with the ends of the rotors form a shearing zone. The homogenizer preferably comprises a hopper for adding the mixture and a conveying screw for delivering the mixture from the hopper to the rotor/stator elements.

Preferably, after homogenization, the product has a Casson viscosity (measured at 40° C.) of less than 8000 mPas, more preferably less than 7000 mPas, even more preferably less than 3000 mPas, with preferred ranges being from 500 to 4500 mPas, more preferably from 1500 to 3500 mPas (such as from 1500 to 2000 mPas), even more preferably from 1200 to 1900 mPas. Methods for determining viscosity are well known to those skilled in the art and include, for example, the method described in the International Office of Cocoa, Chocolate and Sugar Confectionery, IOCCC method 10.

It is an advantage of the invention that the process is carried out without a conching step. Although the process of the invention may include a step of conching in a conch, preferably the process is carried out without conching in a conch. Conching typically takes place over an extended time period. Conching subjects the mixture being conched to a completely different shear regime from that experienced in a rotor/stator homogenizer, as will be well understood by those skilled in the art.

The process of the invention preferably does not involve a step of extrusion, for example of a component, of a mixture or of a product during the process.

Preferably, one or more components selected from emulsifiers and flavouring agents are added during homogenization. Ingredients such as fat and emulsifier may optionally be added after step (i) and before or during homogenization. Preferably, fat and/or emulsifiers and/or flavouring agents are added to the mixture. Fats that are preferably added are selected from the group consisting of cocoa butter, cocoa butter equivalents, butter fat or fractions thereof, palm oil or fractions thereof, coconut or fractions thereof, palm kernel oil or fractions thereof, liquid oils (for example, sunflower oil and/or rapeseed oil), interesterified mixtures of the above fats or fractions or hardened components thereof, or mixtures of one or more of the fats or oils mentioned. The emulsifiers that are preferably added are selected from the group consisting of lecithin, fractionated lecithin and PGPR or mixtures thereof. Flavouring agents that may be added are preferably selected from the group consisting of vanilla and caramel or mixtures thereof.

After homogenizing, the liquid chocolate or chocolate-like product is cooled, typically after forming into a desired shape. The chocolate or chocolate-like product may comprise one or more food additives that are added prior to cooling, such as biscuit, nuts (whole or pieces), crispies, sponge, wafer or fruit, such as cherries, ginger and raisins or other dried fruit. These additives are normally embedded in the chocolate or chocolate-like product in the final product.

The chocolate or chocolate-like product of the invention may take any suitable form and may, for example, be packaged and sold as a block or a bar. Alternatively or additionally, the chocolate or chocolate-like product of the invention may optionally be filled and may be used as a coating. For example, the chocolate or chocolate-like product may be used in other confectionery and bakery applications, for example as a cake coating or filling, a biscuit coating or filling, a sponge coating or filling or a coating layer for an ice cream.

The chocolate or chocolate-like product of the invention may optionally have further additives added prior to the final use of the product. For example, the fat content may be increased to from 35% to 50% (such as about 45%) by weight by adding fat to the chocolate or chocolate-like product prior to use as an ice cream coating.

The chocolate or chocolate-like product may be used in applications comprising, for example, one or more of moulding, enrobing, dipping, bottoming, filling and panning.

Chocolate-like products include fat-continuous confectionery fillings. Fillings preferably comprise fat, sugar and optionally one or more of dairy powder (including milk powder and/or yoghurt powder), and flavouring agents. Suitable flavouring agents include, but are not limited to, fruit, nut, and vanilla flavourings, fruit powder and pieces, nuts, vanilla, herbs (e.g., mint), herb flavourings, caramel and caramel flavourings. Those skilled in the art are familiar with numerous flavourings than can be used.

The invention also provides chocolate and chocolate-like products made according to the process of the invention. The products may have a fat content of at least 26% by weight, preferably at least 27%, most preferably between 28 and 32% by weight.

The listing or discussion of an apparently prior-published document in this specification should not necessarily be taken as an acknowledgement that the document is part of the state of the art or is common general knowledge.

The invention will now be described, by way of non-limiting example only, with reference to the accompanying drawing, which depicts schematically in FIG. 1 a process according to the invention.

FIG. 1 shows schematically a process for producing milk chocolate according to the invention. Ingredients 1, including cocoa powder (CP), milk powder (MP) and sugar are mixed in mixer 2. The mixture is then ground in air classifier mill 3 to reduce the particle size of the solids. The ground mixture then passes to homogenizer 4 where further ingredients 5, such as cocoa butter (CB), fat and emulsifier (e.g., lecithin) are added. The product that exits homogenizer 4 is liquid chocolate 6.

The following non-limiting examples illustrate the invention and do not limit its scope in any way. In the examples and throughout this specification, all percentages, parts and ratios are by weight unless indicated otherwise.

EXAMPLES

Procedure for Determining Particle Size (Fineness) with Micrometer

1. Principle
A small amount of (diluted) product is placed on the measuring surface of the micrometer. By pressing, an indication of the size of the largest non-compressible particles can be received.
2. Material
Micrometer: precision 1 µm.
Solution A: 50% lecithin+50% sunflower oil
3. Sample Preparation
Liquefy the chocolate or semi-finished products and homogenize.
If the product is not liquid (high viscosity, refiner or chocolate powder), add solution A to dilute it:
fill half of a cup with the product (weight=+/−10 gram)
add 2 ml of the solution A with a plastic syringe
mix thoroughly during 2 minutes with a spatula until a liquid solution.
4. Procedure
Verification:
Make sure the surfaces of the micrometer are clean (otherwise clean with paper).
Slowly rotate the micrometer screw until both surfaces are closed.
Verify the instrument reads zero when closed.

Measurement:
Add one or two drops of warm sample on the fixed micrometer surface.
Slowly rotate the micrometer screw until the ratchet clicks twice.
Take the reading.
Clean the surfaces and repeat the measurement three times.
Make an average of the three readings and express the result in µm.

Example 1

A chocolate-like product was produced according to the invention, as depicted in FIG. 1, having the following composition:

| Dark Chocolate like product | | % | fat % at end of stage |
|---|---|---|---|
| Mixer | Cocoa powder | 16.7 | 2.6 |
| | Sugar | 53.2 | |
| Homogeniser | Vegetable fat | 29.4 | 31.2 |
| | Lecithin | 0.7 | |
| Total | | 100 | |
| Casson viscosity mPas | | 1800 | |

Natural cocoa powder and crystal sugar were dosed and mixed according to the above recipe. This mix was refined on an air classifier mill from P. M. Duyvis Machinefabriek BV type ICM12 at a rate of about 100 kg per hour in order to obtain a fineness of 18 µm. The refined powder was then homogenized with vegetable fat (coconut oil 65% and palm oil 35%) and soya lecithin in a rotor-stator homogenizer from Lipp Mischtechnik GmbH type R021 at a ratio of powder to fat of 750 kg to 2500 kg per hour. The resulting product had a temperature of 65° C., corresponding to a temperature increase of about 40° C., and the viscosity measurement gave a Casson viscosity of 1800 mPas at 40° C. and a Casson yield value of 8.5 Pa.

The quotation given to the sample by a professional taste panel was 5.1/7 and the product was described as being as good as a standard high quality product.

Example 2

A milk chocolate like product was produced according to the invention having the following composition:

| Milk Chocolate like product | | % | fat % at end of stage |
|---|---|---|---|
| Mixer | Milk powder | 12.5 | 0.6 |
| | Cocoa powder | 2.5 | |
| | Sugar | 59.6 | |
| Homogeniser | Vegetable fat | 24.8 | 25.5 |
| | Lecithin | 0.6 | |
| Total | | 100 | |
| Casson viscosity mPas | | 3010 | |

Skimmed milk powder, natural cocoa powder and crystal sugar were dosed and mixed, in a ribbon mixer, according the recipe. This mix was refined on an air classifier mill from P. M. Duyvis Machinefabriek BV type ICM12 at a rate of about 100 kg per hour in order to obtain a fineness of 20 µm. The refined powder was then homogenized with cocoa butter and soya lecithin in a rotor-stator homogenizer from Lipp Mischtechnik GMBH type R021 with a throughput of 500 kg/h. The resulting product after the homogenizer had a temperature of 69° C. The viscosity measurement gave a Casson viscosity of 3010 mPas and a Casson yield value of 11.7 Pa.

The analytical and taste results of this product gave no significant difference with a reference production performed with the same raw materials.

The invention claimed is:

1. Process for producing chocolate or a chocolate-like product comprising:
   (i) dry grinding a mixture of solid components of chocolate or a chocolate-like product; and
   (ii) homogenizing the ground mixture with fat to form a liquid chocolate or chocolate-like product, wherein the mixture comprises fat in an amount of less than 22% by weight of the mixture
   wherein the process is carried out without a conching step.

2. Process according to claim 1, wherein the dry grinding is carried out using a classifier mill.

3. Process according to claim 2, wherein the dry grinding is carried out using an air classifier mill.

4. Process according to claim 1, wherein the homogenization is carried out using a rotor/stator homogenizer.

5. Process according to claim 1, wherein in (i) the mixture is ground such that it comprises solids having a particle size of less than 50 μm.

6. Process according to claim 1, wherein the solid components are selected from the group consisting of cocoa solids, sugars, sugar substitutes, milk powders, fat and mixtures thereof.

7. Process according to claim 6, wherein the cocoa solids are selected from cocoa powders, expeller flake and mixtures thereof.

8. Process according to claim 6, wherein the milk powders are selected from skimmed milk powder, whey powder, derivatives of whey powder, full cream milk powder and mixtures thereof.

9. Process according to claim 6, wherein the sugars are selected from sucrose, fructose, glucose, dextrose and mixtures thereof.

10. Process according to claim 6, wherein the sugar substitutes are selected from inulin, dextrin, isomaltulose, polydextrose, maltitol and mixtures thereof.

11. Process according to claim 1, wherein the mixture of step (i) comprises fat in an amount of less than 12% by weight of the mixture.

12. Process according to claim 1, wherein the mixture of step (i) comprises fat in an amount of from 0.1 to 8% by weight of the mixture.

13. Process according to claim 1, wherein the homogenizing step is carried out such that a temperature rise of at least 10° C. is achieved in the mixture by mechanical input.

14. Process according to claim 1, wherein the homogenization is carried out to give a mixture having a Casson viscosity (measured at 40° C.) of less than 3000 mPas.

15. Process according to claim 1, wherein the fat in the homogenizing step is selected from the group consisting of cocoa butter, cocoa butter equivalents, butter fat or fractions thereof, palm oil or fractions thereof, coconut or fractions thereof, palm kernel oil or fractions thereof, liquid vegetable oils, interesterified mixtures of the above fats or fractions or hardened components thereof, or mixtures thereof.

16. Process according to claim 1, wherein the homogenizing step is carried out such that the reduction in the particle size during homogenization is less than 25%.

17. Process according to claim 1, wherein the homogenizing step is carried out such that the particle size does not change significantly during the homogenization step.

18. Process according to claim 1, wherein the homogenizing step is carried out in the presence of an emulsifier.

19. Process according to claim 18, wherein the emulsifier is selected from the group consisting of lecithin, fractionated lecithin and PGPR and mixtures thereof.

20. Process according to claim 1, wherein one or more components selected from emulsifiers and flavouring agents are added during homogenization.

21. Process for producing chocolate or a chocolate-like product comprising:
   (i) dry grinding a mixture of solid components of chocolate or a chocolate-like product; and
   (ii) homogenizing the ground mixture with fat to form a liquid chocolate or chocolate-like product, wherein the homogenizing is carried out to give a mixture having a Casson viscosity (measured at 40° C.) of less than 3000 mPas,
   wherein the process is carried out without a conching step.

22. Process for producing chocolate or a chocolate-like product comprising:
   (i) dry grinding a mixture of solid components of chocolate or a chocolate-like product; and
   (ii) homogenizing the ground mixture with fat to form a liquid chocolate or chocolate-like product, wherein the homogenizing is carried out such that the reduction in the particle size during homogenization is less than 25%
   wherein the process is carried out without a conching step.

* * * * *